United States Patent
Thakkar et al.

(10) Patent No.: US 10,133,749 B2
(45) Date of Patent: Nov. 20, 2018

(54) CONTENT LIBRARY-BASED DE-DUPLICATION FOR TRANSFERRING VMS TO A CLOUD COMPUTING SYSTEM

(71) Applicant: VMware, Inc., Palo Alto, CA (US)

(72) Inventors: Sachin Thakkar, San Jose, CA (US);
Serge Maskalik, Los Gatos, CA (US);
Debashis Basak, San Jose, CA (US);
Weiqing Wu, Cupertino, CA (US);
Allwyn Sequeira, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 541 days.

(21) Appl. No.: 14/582,461

(22) Filed: Dec. 24, 2014

(65) Prior Publication Data

US 2016/0103712 A1 Apr. 14, 2016

Related U.S. Application Data

(60) Provisional application No. 62/063,275, filed on Oct. 13, 2014.

(51) Int. Cl.
*G06F 17/30* (2006.01)
*G06F 9/48* (2006.01)
*G06F 9/50* (2006.01)

(52) U.S. Cl.
CPC ...... *G06F 17/30156* (2013.01); *G06F 9/4856* (2013.01); *G06F 9/5077* (2013.01)

(58) Field of Classification Search
CPC .. G06F 21/53; G06F 9/4558; G06F 2211/008; G06F 17/30156; G06F 17/2288; G06F 17/24; G06F 17/30575
See application file for complete search history.

(56) References Cited

U.S. PATENT DOCUMENTS

| | | | | |
|---|---|---|---|---|
| 7,814,149 B1 * | 10/2010 | Stringham | ........ | G06F 17/30156 707/758 |
| 2012/0278799 A1 * | 11/2012 | Starks | ..................... | G06F 9/455 718/1 |
| 2013/0132942 A1 * | 5/2013 | Wang | .................. | G06F 9/45504 717/176 |
| 2013/0275376 A1 * | 10/2013 | Hudlow | .................. | H04L 67/34 707/639 |

\* cited by examiner

*Primary Examiner* — Scott A. Waldron
*Assistant Examiner* — Fatima P Mina
(74) *Attorney, Agent, or Firm* — Loza & Loza, LLP

(57) ABSTRACT

An example provides a method of creating an instance of a virtual machine in a cloud computing system that includes: accepting a network connection at a server resource in the cloud computing system from a first client resource in a first virtualized computing system to transfer a first virtual machine; receiving first signatures for guest files of the first virtual machine from the first client resource; checking the first signatures against a content library in the cloud computing system to identify first duplicate files of the guest files that match first base files stored in the content library, and to identify first unique files of the guest files; instructing the first client resource such that a response to the instructing will send the first unique files to the exclusion of the first duplicate files; and generating an instance of the first virtual machine in the cloud computing system having the first base files and the first unique files.

20 Claims, 4 Drawing Sheets

CONTENT LIBRARY-BASED DE-DUPLICATION FOR TRANSFERRING VMS TO A CLOUD COMPUTING SYSTEM

CROSS-REFERENCE TO RELATED APPLICATIONS

This application claims priority to U.S. Provisional Application Ser. No. 62/063,275, filed Oct. 13, 2014, which is incorporated by reference in its entirety.

BACKGROUND

Cloud architectures are used in cloud computing and cloud storage systems for offering infrastructure-as-a-service (IaaS) cloud services. Examples of cloud architectures include the VMware vCloud™ Director cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks. One operation provided by some services is the transfer to the cloud system of VMs on existing computing resources managed by customers. VMs can encompass large amounts of data on the order of tens or hundreds of gigabytes (GB) or even more. Thus, transfer of a VM to the cloud system over a network, such as the public Internet, can take a tong time to complete and consume significant resources.

SUMMARY

One or more embodiments provide techniques for creating instances of transferred virtual machines in a cloud computing system. In an example, a method of creating an instance of a virtual machine in a cloud computing system includes: accepting a network connection at a server resource in the cloud computing system from a first client resource in a first virtualized computing system to transfer a first virtual machine; receiving first signatures for guest files of the first virtual machine from the first client resource; checking the first signatures against a content library in the cloud computing system to identify first duplicate files of the guest files that match first base files stored in the content library, and to identify first unique files of the guest files that are not stored in the content library; instructing the first client resource such that a response to the instructing will send the first unique files to the exclusion of the first duplicate files; and generating an instance of the first virtual machine in the cloud computing system having the first base files from the content library and the first unique files received from the first client resource.

Further embodiments include a non-transitory computer-readable storage medium comprising instructions that cause a computer system to carry out the above method above, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
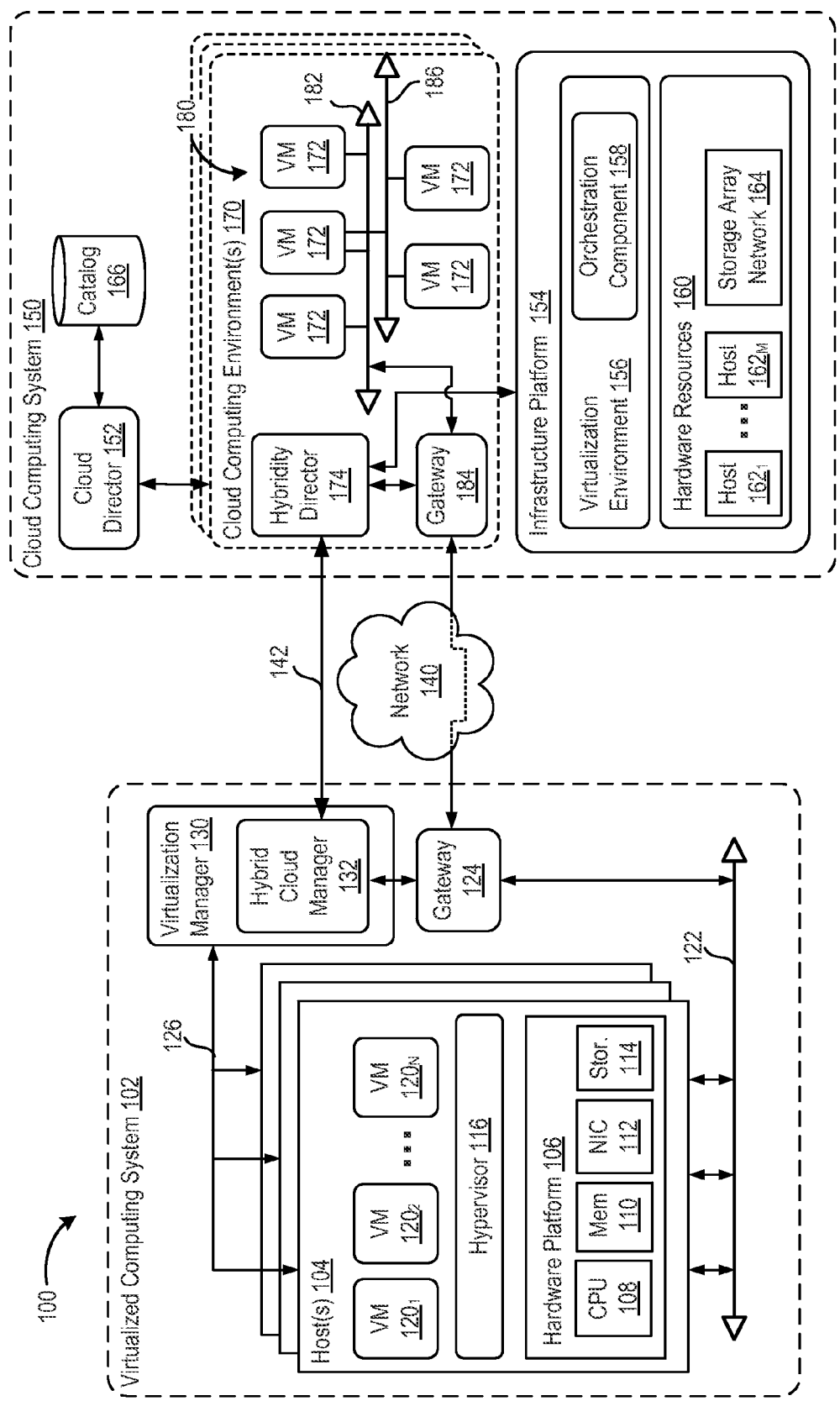
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware® ESXi™ hypervisor provided as part of the VMware® vSphere® solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity directory 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Figure 2:
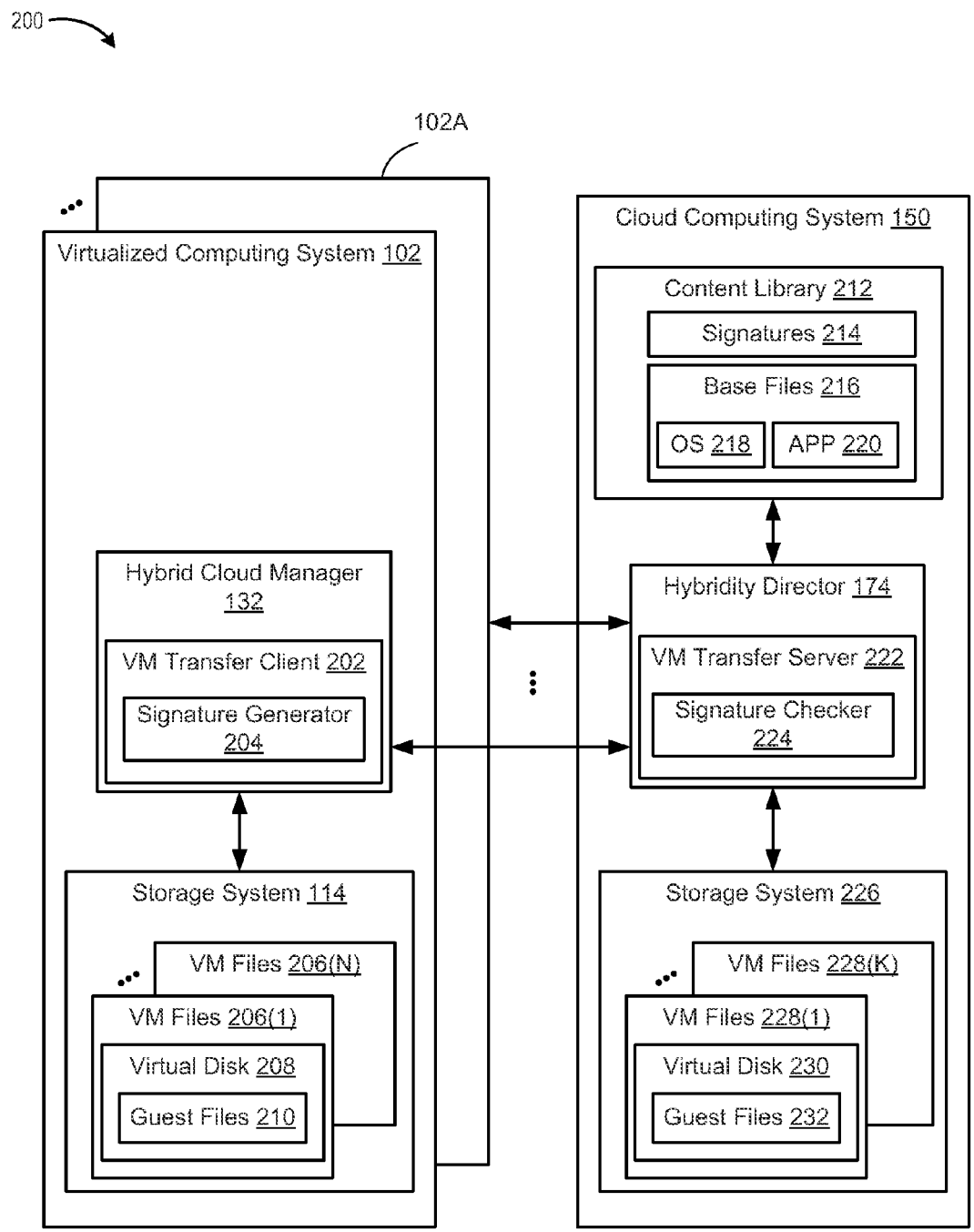
FIG. 2 is a block diagram showing an example of a system for transferring virtual machines between a virtualized computing system and a cloud computing system.

FIG. 2 is a block diagram showing an example of a system 200 for transferring virtual machines between virtualized computing systems and a cloud computing system. System 200 includes virtualized computing system 102 coupled to cloud computing system 150. System 200 can also include one or more additional virtualized computing systems 102A, where each of virtualized computing systems 102A is configured similarly to virtualized computing system 102. Virtualized computing system 102 includes a first resource connected to a second resource in cloud computing system 150. In the example shown, the first resource comprises hybrid cloud manager 132 and the second resource comprises hybridity director 174. The connection between hybrid cloud manager 132 and hybridity director 174 comprises a network connection that can be made over direct connection 142 or through network 140 using gateways 124, 184. In one or more embodiments, the network connection between hybrid cloud manager 1132 and hybridity director 174 may be a trusted connection established using identity verification and encryption techniques known to those skilled in the art. Hybridity director 174 can also include network connections with hybrid cloud manager(s) in any or all of virtualized computing system(s) 102A.

In an example, hybrid cloud manager 132 includes a VM transfer client 202, and hybridity director 174 includes a VM transfer server 222. VM transfer client 202 and VM transfer server 222 cooperate to transfer VM(s) between virtualized computing system 102 and cloud computing system 150. VM transfer server 222 can also cooperate with other VM transfer client(s) of any or all of virtualized computing system(s) 102A in similar fashion.

Hybrid cloud manager 132 can access storage system 114 via virtualized computing system 102. Storage system 114 includes a set of VM files for implementing each of VMs 120. Thus, storage system 114 stores sets of VM files 206(1) through 206(N), where VM files 206(1) implement VM 120(1), VM files 206(2) implement VM 120(2), and so on. Each set of VM files 206 includes various files used to implement a VM, such as configuration file(s), virtual disk file(s), virtual disk delta file(s) and configuration file(s) associated with VM snapshot(s), basic input output system (BIOS) file(s), log file(s), and the like. In the present example, each of VM files 206 includes virtual disk file(s) that provide a virtual disk 208. A "virtual disk" is an abstraction of a block-based storage device, such as a hard disk drive, for a VM. Virtual disk 208 stores guest files 210 for a VM. "Guest files" include files for implementing a guest operating system (OS) in a VM, files for implementing guest application(s) running in the guest OS, and files containing data for use with the guest OS/guest application(s). For clarity, each of VM files 206 is shown as having a single virtual disk, but in general VM files implementing a VM can include virtual disk file(s) that provide one or more virtual disks.

Hybridity director 174 can access a storage system 226 in cloud computing system 150. For example, storage system 226 can be part of storage array network 164. Storage system 226 includes a set of VM files for implementing each of VMs 172. Thus, storage system 226 stores VM files 228(1) through 228(K), where K is an integer greater than one. Each set of VM files 228 includes files used to implement a VM similar to VM files 206 described above. In the present example, each set of VM files 228 includes virtual disk file(s) that provide a virtual disk 230 having guest files 232. Some of VMs 172 can be VM(s) managed by hybrid cloud manager 130, including instances of VMs that were transferred from virtualized computing system 102. Some of VMs 172 can be VM(s) managed by hybrid cloud manager(s) of any or all of virtualized computing system(s) 102A. Thus, sets of VM files 228 correspond to VMs 170 that can be managed by one or more virtualized computing systems, including instances of VMs that have been transferred from one or more virtualized computing systems.

In operation, an administrator of virtualized cloud system 102 interacts with virtualization manager 130, hybrid cloud manager 132, or both to request transfer of a selected VM from virtualized computing system 102 to cloud computing system 150. Hybrid cloud manager 132 invokes VM transfer client 202 to begin the transfer of the selected VM. VM transfer client 202 accesses a set of VM files 206 for the selected VM on storage system 114. VM transfer client 202 does not immediately transfer virtual disk 208. Instead, VM transfer client 202 invokes a signature generator 204. Signature generator 204 generates a signature for each of guest files 210. Signature generator 204 can use, for example, a hash function that maps each guest file to a hash value of fixed size with a tow probability of collisions. Various such hash functions are well known in the art. VM transfer client 202 initially sends signatures associated with guest files 210 to VM transfer service 222, rather guest files 210 themselves.

VM transfer server 222 includes a signature checker 224. VM transfer server 222 is also configured to access a content library 212. Content library 212 can include data stored on a storage device in cloud computing system 150, such as a storage device in storage array network 164. VM transfer server 222 can access the storage device to parse and obtain data from content library 212. In another example, content library 212 can be implemented by a host in cloud computing system 150 (e.g., a host 162) executing a database server or the like. VM transfer server 222 can query the host and obtain data from content library 212. Content library 212 stores signatures 214 and base files 216. Each signature 214 can be associated with a base file 216. For example, a signature 214 can be a hash value generated by applying the same hash function used by signature generator 204 to a base file 216.

In one embodiment, hybridity director 174 may generate content library 212 based on VM files of VMs instantiated for various tenants within cloud computing system 150. As such, a shared content library 212 may be made available to multiple tenants for performing de-duplication during VM migration, or alternatively, a separate content library 212 may be maintained for each tenant of cloud computing system 150. In one approach, hybridity director 174 may build content library 212 using signatures generated for files within catalog 166 of available virtual machine templates and packaged virtual machine applications that represent virtual machines that may be provisioned in cloud computing environment 170. In another approach, hybridity director 174 may build, as well as update, content library 212 based on incoming signatures and unique files received from VM migration process(es) during operation.

Signature checker 224 receives signatures from VM transfer client 202. Signature checker 224 checks the signatures against content library 212 to identify duplicate files of guest files 210 that match base files in content library 212, and unique files of guest files 210 not stored in content library 212. In extreme cases, signature checker 224 can determine that there are no duplicate files of guest files 210, or signature checker 224 can determine that there are no unique files of guest files 210. In most cases, however, signature checker 224 can identify some duplicate files and some unique files based on signatures received from VM transfer client 202. Signature checker 224 indicates those signatures associated with unique files to VM transfer server 222. VM transfer server 222 sends signatures associated with unique files back to VM transfer client 202.

VM transfer client 202 then transfers the unique files of guest files 210 to VM transfer server 222 over the network connection. VM transfer client 202 does not transfer any of the duplicate files over the network connection. By transferring only the unique files, VM transfer client 202 conserves network bandwidth and can potentially transfer a VM more quickly than if the all guest files 210 are transferred over the network connection. In addition, the signatures of the unique files can be transferred along with the unique files, which allows the destination to omit having to compute the signatures.

VM transfer server 222 generates an instance of the transferred VM in cloud computing system 150. VM transfer server 222 stores a set of VM files 228 that implement the transferred VM. The set of VM files for the transferred VM include virtual disk 230 having guest files 232. Guest files 232 include base files corresponding to the duplicate files identified by signature checker 224, and unique files received from VM transfer client 202. In this manner, virtual disk 208 for a selected VM in virtualized computing system 102 is reconstituted as virtual disk 230 in cloud computing system 150 by only transferring unique files of guest files 210 over the network connection. VM transfer server 220 can perform the functions described above for one or more additional VMs to be transferred from virtualized computing system 102. VM transfer server 220 can perform the functions described above for one or more additional VMs to be transferred from any or all of virtualized computing system(s) 102A.

Some base files 216 stored in content library 212 can be associated to form collections. For example, base files 216 can include base OS files 218 and base application (APP) files 220. Base OS files 218 can include collection(s) of files implementing one or more operating systems. Example operating systems include Microsoft® Windows® operating systems available from Microsoft Corp., OS X® operating systems available from Apple, Inc., Linux® operating systems available in various distributions from various distributors, and the like. Each collection of base OS files 218 can include a particular OS having a particular configuration. Base APP files 220 can include collection(s) of files implementing one or more applications. In some examples, a given collection of base OS files 218 can include both files for an OS and files for application(s) installed in the OS.

The VM transfer server 222 can form virtual disk 230 for a given transferred VM using various techniques. In one example, VM transfer server 222 can create a virtual disk, obtain individual base files 216 from content library 212 for each detected duplicate file, write the base files to the virtual disk, and then write the unique files obtained from VM transfer client 202 to the virtual disk. In another example, VM transfer server 222 can identify a particular OS, particular application(s), or both from the signatures received from VM transfer client 202. When signature checker 224 checks signatures against content library 212, signature checker 224 can determine that the VM to be transferred includes a particular OS, particular application(s), or both. When creating a virtual disk, VM transfer server 222 can obtain collection(s) of base files from content library 212 and write those collection(s) of base files to the virtual disk, rather than individually obtaining and writing base files to the virtual disk. VM transfer server 222 can then write the unique files received from VM transfer client 202 to the virtual disk, potentially overwriting one or more of the base files.

For example, through signature checking, signature checker 224 can determine that the VM to be transferred includes a particular Microsoft® Windows® OS. When creating the virtual disk for the transferred VM, VM transfer client 202 can obtain and write the collection of base OS files 218 corresponding to the particular Microsoft® Windows® OS. If the original VM had any customizations to the OS, the signature checker 224 will have flagged the customized file(s) as unique files, since such customized files are not stored in content library 212. VM transfer server 222 writes the unique files to the virtual disk, overwriting one or more of the Microsoft® Windows® OS based files with the customized unique files. VM transfer client 202 can perform a similar function with any particular application.

In another example, base OS files 218 for any particular OS can be stored in content library 212 as a virtual disk. VM transfer server 222 can obtain the virtual disk for a given OS identified by signature checker 224 from content library 212, rather than creating a new virtual disk. VM transfer server 222 can resize the virtual disk if necessary and then copy the unique files obtained from VM transfer client 202 to the virtual disk, as well as any other base files obtained from content library 212 (e.g., individual base files or base APP files).

While VM transfer client 202 invokes signature generator 204 for guest files 210 of virtual disk 208, VM transfer client 202 can transfer some of VM files 206 without generating signatures and having such signatures checked. For example, VM transfer client 202 can transfer configuration files, log files, and the like along with the signatures of guest files 210.

Figure 3:
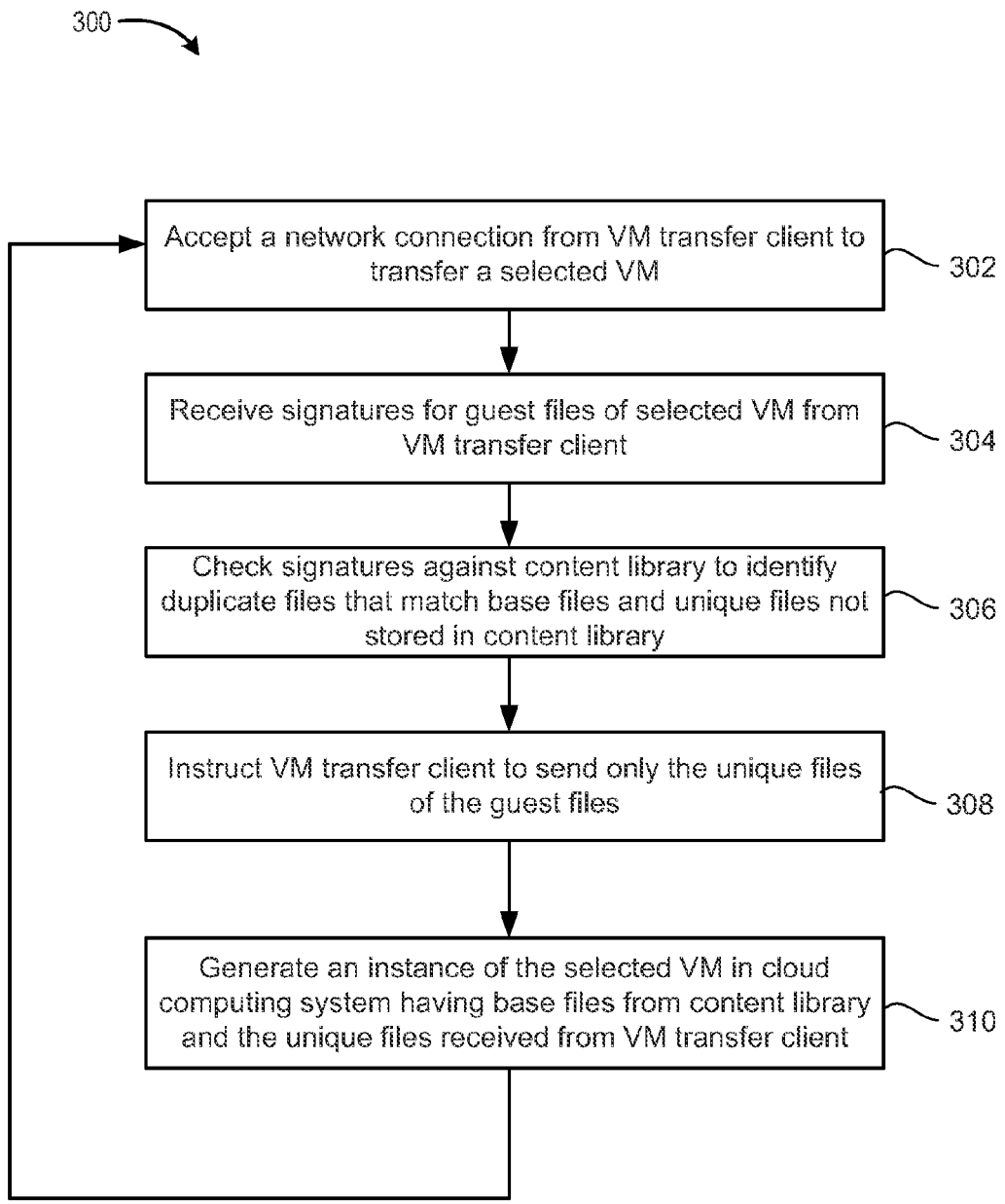
FIG. 3 is a flow diagram showing an example of a method of creating an instance of a virtual machine in a cloud computing system.

FIG. 3 is a flow diagram showing an example of a method 300 of creating an instance of a virtual machine in a cloud computing system. Method 300 can be performed by a resource in cloud computing system 150, such as hybridity director 174, in response to a transfer of a VM from a virtualized computing system. Method 300 begins at step 302, where VM transfer server 222 accepts a network connection from a VM transfer client in a virtualized computing system to transfer a selected VM. At step 304, VM transfer server 222 receives signatures for guest files of the selected VM from the VM transfer client. At step 306, VM transfer server 222 checks signatures against content library 212 to identify duplicate files that match base files and unique files not stored in content library 212. At step 308, VM transfer server 222 instructs the VM transfer client such that the VM transfer client responds by sending the unique files of the guest files for the selected VM to the exclusion of the duplicate files. In some embodiments, VM transfer server 222 instructs the VM transfer client to send the unique files of the guest files for the selected VM, and not to send the duplicate files. In yet other embodiments, VM transfer server 222 instructs the VM transfer client to send the guest files for the selected VM except for particular specified files indicated as duplicate. At step 310, VM transfer server 222 generates an instance of the selected VM in cloud computing system 150 having the base files corresponding to the duplicate files and the unique files received from the VM transfer client. VM transfer server 222 can repeat method 300 to transfer other VMs from the same virtualized computing environment or from other virtualized computing environments. VM transfer server 222 can also accept multiple network connections from VM transfer clients concurrently and thus can perform multiple instances of method 300 concurrently.

Figure 4:
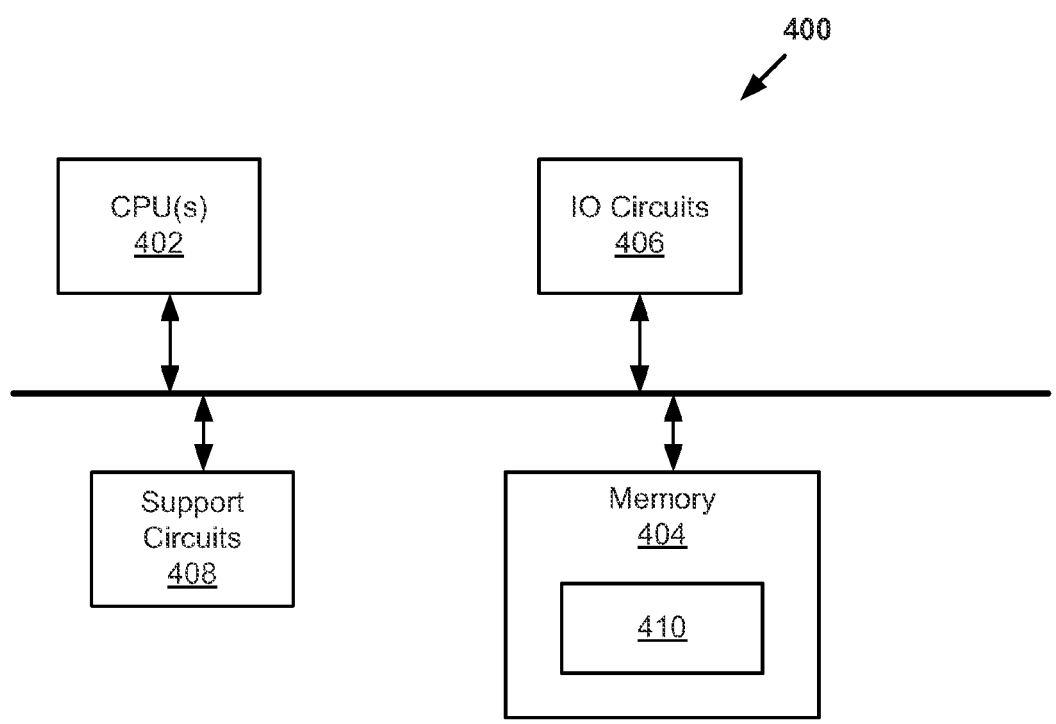
FIG. 4 is a block diagram depicting an example of a computer system in which one or more embodiments of the present disclosure may be utilized.

FIG. 4 is a block diagram depicting an example of a computer system 400 in which one or more embodiments of the present disclosure may be utilized. Computer system 400 can be used as a host to implement hybrid cloud manager 132 or hybridity director 174. Computer system 400 includes one or more central processing units (CPUs) 402, memory 404, input/output (IO) circuits 406, and various support circuits 408. Each of CPUs 402 can include any microprocessor known in the art and can execute instructions stored on computer readable storage, such as memory 404. Memory 404 can include various volatile and/or non-volatile memory devices, such as random access memory (RAM), read only memory (ROM), and the like. Instructions and data 410 for performing the various methods and techniques described above can be stored in memory 404 for execution by CPUs 402. That is, memory 404 can store instructions executable by CPUs 402 to perform method 300. Support circuits 408 include various circuits used to support operation of a computer system as known in the art.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of creating an instance of a virtual machine in a cloud computing system, comprising:
   accepting a network connection at a server resource in the cloud computing system from a first client resource in a first virtualized computing system to transfer a first virtual machine;
   receiving first signatures for guest files of the first virtual machine from the first client resource;
   checking the first signatures against a content library in the cloud computing system to identify first duplicate files of the guest files that match first base files stored in the content library, and to identify first unique files of the guest files that are not stored in the content library, comprising checking the first signatures against the content library in the cloud computing system to identify a particular operating system or a particular application that is included in the first virtual machine;
   instructing the first client resource such that a response to the instructing will send the first unique files to the exclusion of the first duplicate files; and
   generating an instance of the first virtual machine in the cloud computing system having the first base files from the content library and the first unique files received from the first client resource.

2. The method of claim 1, further comprising:
   accepting another network connection at the server resource from a second client resource in a second virtualized computing system to transfer a second virtual machine; and
   receiving second signatures for guest files of the second virtual machine from the second client resource;
   checking the second signatures against the content library to identify second duplicate files of the guest files that match second base files stored in the content library, and to identify second unique files of the guest files that are not stored in the content library;
   instructing the second client resource such that a response to the instructing the second client resource will send the second unique files to the exclusion of the second duplicate files; and
   generating an instance of the second virtual machine in the cloud computing system having the second base files from the content library and the second unique files received from the second client resource.

3. The method of claim 1, further comprising:
   accepting another network connection at the server resource from a second client resource in a second virtualized computing system to transfer a second virtual machine; and
   receiving second signatures for guest files of the second virtual machine from the second client resource;
   checking the second signatures against the content library to identify second duplicate files of the guest files that match second base files stored in the content library; and
   generating an instance of the second virtual machine in the cloud computing system having the second base files from the content library.

4. The method of claim 1, wherein the first base files comprise a collection of base files associated with an operating system.

5. The method of claim 1, wherein the first base files comprise a collection of base files associated with an application.

6. The method of claim 1, wherein the first base files comprise a plurality of individual base files.

7. The method of claim 1, wherein the step of generating the instance comprises:
generating a virtual disk having the first base files and the first unique files stored thereon, including writing at least one collection of base files to the virtual disk and overwriting one or more of the base files of the at least one collection of base files with the first unique files.

8. A computer system, comprising:
a memory configured to store code; and
a processor configured to execute the code to:
accept a network connection at a server resource in the cloud computing system from a first client resource in a first virtualized computing system to transfer a first virtual machine;
receive first signatures for guest files of the first virtual machine from the first client resource;
check the first signatures against a content library in the cloud computing system to identify first duplicate files of the guest files that match first base files stored in the content library, and to identify first unique files of the guest files that are not stored in the content library, comprising check the first signatures against the content library in the cloud computing system to identify a particular operating system or a particular application that is included in the first virtual machine;
instruct the first client resource such that a response to the instruction will send the first unique files to the exclusion of the first duplicate files; and
generate an instance of the first virtual machine in the cloud computing system having the first base files from the content library and the first unique files received from the first client resource.

9. The computer system of claim 8, wherein the processor is further configured to execute the code to:
accept another network connection at the server resource from a second client resource in a second virtualized computing system to transfer a second virtual machine; and
receive second signatures for guest files of the second virtual machine from the second client resource;
check the second signatures against the content library to identify second duplicate files of the guest files that match second base files stored in the content library, and to identify second unique files of the guest files that are not stored in the content library;
instruct the second client resource such that a response to the instruction of the second client resource will send the second unique files to the exclusion of the second duplicate files; and
generate an instance of the second virtual machine in the cloud computing system having the second base files from the content library and the second unique files received from the second client resource.

10. The computer system of claim 8, wherein the processor is further configured to execute the code to:
accept another network connection at the server resource from a second client resource in a second virtualized computing system to transfer a second virtual machine; and
receive second signatures for guest files of the second virtual machine from the second client resource;
check the second signatures against the content library to identify second duplicate files of the guest files that match second base files stored in the content library; and
generate an instance of the second virtual machine in the cloud computing system having the second base files from the content library.

11. The computer system of claim 8, wherein the first base files comprise a collection of base files associated with an operating system.

12. The computer system of claim 8, wherein the first base files comprise a collection of base files associated with an application.

13. The computer system of claim 8, wherein the first base files comprise a plurality of individual base files.

14. The computer system of claim 8, wherein the processor is further configured to execute the code to:
generate a virtual disk having the first base files and the first unique files stored thereon by at least writing at least one collection of base files to the virtual disk and overwriting one or more of the base files of the at least one collection of base files with the first unique files.

15. A non-transitory computer readable medium comprising instructions, which when executed in a computer system, causes the computer system to carry out a method of creating an instance of a virtual machine in a cloud computing system, comprising:
accepting a network connection at a server resource in the cloud computing system from a first client resource in a first virtualized computing system to transfer a first virtual machine;
receiving first signatures for guest files of the first virtual machine from the first client resource;
checking the first signatures against a content library in the cloud computing system to identify first duplicate files of the guest files that match first base files stored in the content library, and to identify first unique files of the guest files that are not stored in the content library, comprising checking the first signatures against the content library in the cloud computing system to identify a particular operating system or a particular application that is included in the first virtual machine;
instructing the first client resource such that a response to the instructing will send the first unique files to the exclusion of the first duplicate files; and
generating an instance of the first virtual machine in the cloud computing system having the first base files from the content library and the first unique files received from the first client resource.

16. The non-transitory computer readable medium of claim 15, further comprising:
accepting another network connection at the server resource from a second client resource in a second virtualized computing system to transfer a second virtual machine; and
receiving second signatures for guest files of the second virtual machine from the second client resource;
checking the second signatures against the content library to identify second duplicate files of the guest files that match second base files stored in the content library, and to identify second unique files of the guest files that are not stored in the content library;
instructing the second client resource such that a response to the instructing the second client resource will send the second unique files to the exclusion of the second duplicate files; and generating an instance of the second virtual machine in the cloud computing system having the second base files from the content library and the second unique files received from the second client resource.

17. The non-transitory computer readable medium of claim 15, further comprising:
accepting another network connection at the server resource from a second client resource in a second virtualized computing system to transfer a second virtual machine; and
receiving second signatures for guest files of the second virtual machine from the second client resource;
checking the second signatures against the content library to identify second duplicate files of the guest files that match second base files stored in the content library; and
generating an instance of the second virtual machine in the cloud computing system having the second base files from the content library.

18. The non-transitory computer readable medium of claim 15, wherein the first base files comprise a collection of base files associated with an operating system.

19. The non-transitory computer readable medium of claim 15, wherein the first base files comprise a collection of base files associated with an application.

20. The non-transitory computer readable medium of claim 15, wherein the first base files comprise a plurality of individual base files.

\* \* \* \* \*